(12) United States Patent
van de Veerdonk

(10) Patent No.: US 9,099,142 B2
(45) Date of Patent: Aug. 4, 2015

(54) RADIALLY DEPENDENT THERMAL HEAT RESIST LAYER

(71) Applicant: Seagate Technology LLC, Cupertino, CA (US)

(72) Inventor: René van de Veerdonk, Pleasanton, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/199,896

(22) Filed: Mar. 6, 2014

(65) Prior Publication Data

US 2014/0269231 A1  Sep. 18, 2014

Related U.S. Application Data

(60) Provisional application No. 61/778,370, filed on Mar. 12, 2013.

(51) Int. Cl.
| | |
|---|---|
| *G11B 5/66* | (2006.01) |
| *G11B 5/82* | (2006.01) |
| *G11B 5/73* | (2006.01) |
| *G11B 5/74* | (2006.01) |
| *G11B 5/00* | (2006.01) |

(52) U.S. Cl.
CPC ............. *G11B 5/82* (2013.01); *G11B 5/7325* (2013.01); *G11B 5/746* (2013.01); *G11B 2005/0021* (2013.01)

(58) Field of Classification Search
CPC ........ G11B 5/66; G11B 5/732; G11B 5/7325; G11B 5/738; G11B 2005/0021; G11B 13/04
USPC ................. 360/59; 428/831, 831.2; 369/13.4
See application file for complete search history.

(56) References Cited

U.S. PATENT DOCUMENTS

| | | |
|---|---|---|
| 6,258,459 B1 | 7/2001 | Noguchi et al. |
| 6,808,783 B1 * | 10/2004 | Lin et al. ......................... 428/832 |
| 7,592,079 B1 * | 9/2009 | Acharya et al. ............... 428/827 |
| 8,107,800 B2 | 1/2012 | Bezama et al. |
| 8,349,078 B2 | 1/2013 | Shiomi et al. |
| 8,576,672 B1 * | 11/2013 | Peng et al. ................... 369/13.14 |
| 8,765,273 B1 * | 7/2014 | Kubota et al. .............. 428/831.2 |
| 2003/0128635 A1 | 7/2003 | Ruigrok et al. |
| 2006/0104570 A1 | 5/2006 | Rausch |
| 2008/0232225 A1 | 9/2008 | Cho et al. |
| 2011/0043941 A1 | 2/2011 | Champion et al. |

FOREIGN PATENT DOCUMENTS

KR   10-0718146   5/2007

* cited by examiner

*Primary Examiner* — Holly Rickman

(57) ABSTRACT

The embodiments disclose a data storage device including a thickness gradient heat sink layer deposited over a heat sink layer deposited over a substrate, a thickness gradient non-magnetic thermal resist layer deposited over the thickness gradient heat sink layer, and a magnetic layer deposited over the thickness gradient non-magnetic thermal resist layer.

21 Claims, 4 Drawing Sheets

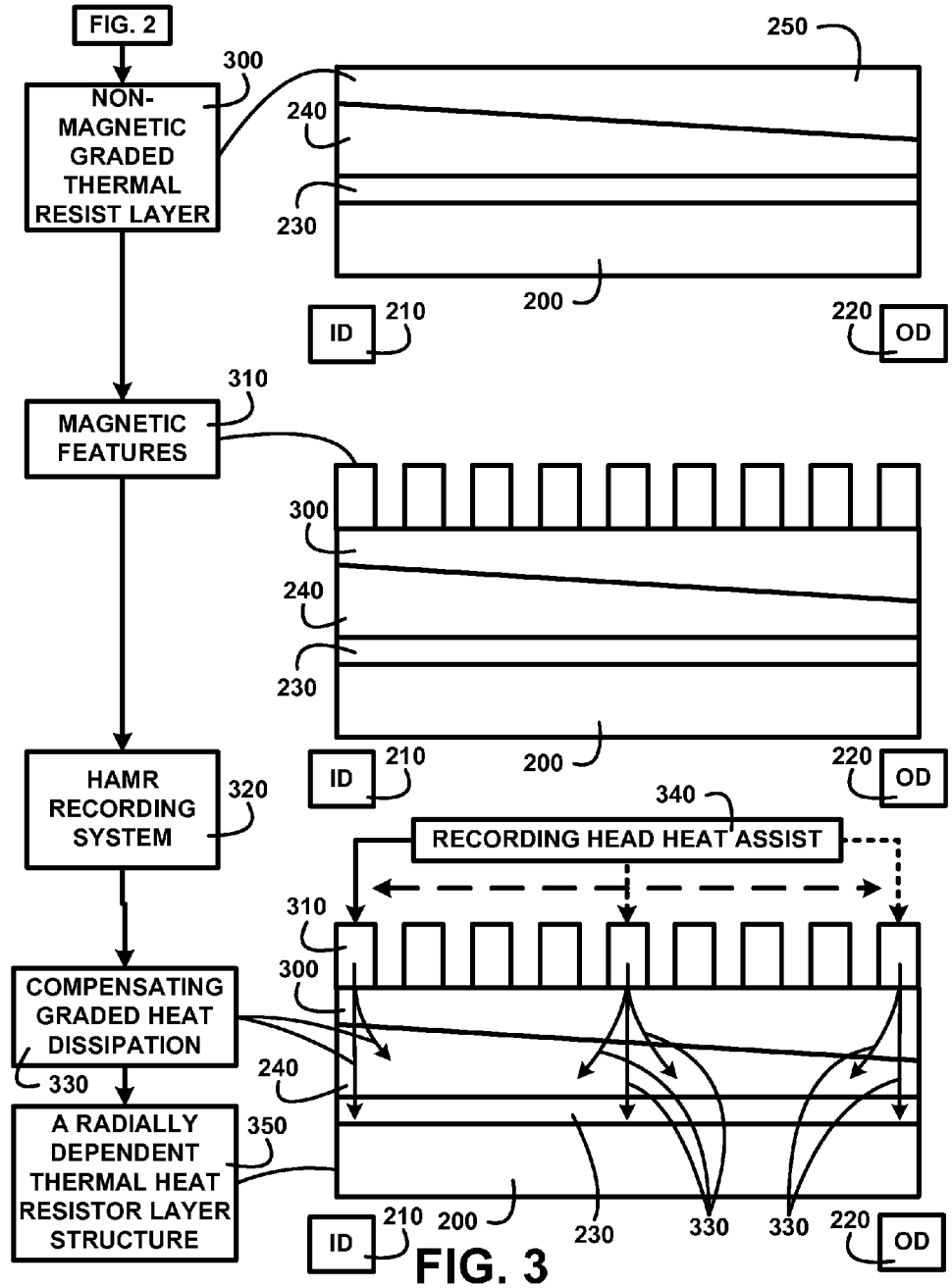

RADIALLY DEPENDENT THERMAL HEAT RESIST LAYER

CROSS-REFERENCE TO RELATED APPLICATIONS

This application is based on U.S. Provisional Patent Application Ser. No. 61/778,370 filed Mar. 12, 2013, entitled "A Radially Dependent Thermal Heat Resistor Layer", by First Named Inventor René van de Veerdonk.

BRIEF DESCRIPTION OF THE DRAWINGS

FIG. 3 shows for illustrative purposes only an example of a radially dependent thermal heat resistor layer structure of one embodiment.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of a radially dependent thermal heat resistor layer is described for illustrative purposes and the underlying system can apply to any number and multiple types sputter sources. In one embodiment of the present invention, the radially dependent thermal heat resistor layer can be configured using an intentional variation across the radial direction of media surface. The radially dependent thermal heat resistor layer can be configured to include a graded thermal resistor layer and can be configured to include a thickness and/or composition gradient across the radius of the disk using the present invention. Herein the term "graded" has a contextual meaning of an intentional variation across the radial direction of a media surface.

Heat Assisted Magnetic Recording (HAMR) is a novel recording technology slated for implementation in future hard-disk drives. The technology is based on heating the media to reduce its effective coercivity, and recording the information while the media cools down in an applied magnetic field. The speed of heating and cooling is critical in the recording process. This rate is controlled by the linear velocity of the recording head and the thermal time constant of the media.

The media layer stack is designed such that there is a thermal resistor layer directly underneath the recording layer. By tuning the properties of this layer (using thickness, composition, and/or multi-layering) the thermal time constant of the media can be matched to the requirements of the recording head. The result with this approach is that the linear velocity of the media is not a constant across the stroke of the media. For example, at a near-ID radius of 15 mm, the linear velocity will be half that of a near-OD radius of 30 mm due to tangential speeds. This means that the thermal time-constant for the media cannot be matched across the full stroke of the media surface.

The radially dependent thermal heat resistor layer uses a graded thermal resistor layer, where graded in this context means an intentional variation across the radial direction of media surface. Using triatron or other dedicated sputter sources, it is possible to engineer a thickness and/or composition gradient across the radius of the disk. By engineering the thermal resistor properties as a function of the radial position on the disk, the media thermal time constant profile can be matched against the linear velocity profile. This in turn will translate in an improved robustness of the HAMR recording system.

Figure 1:
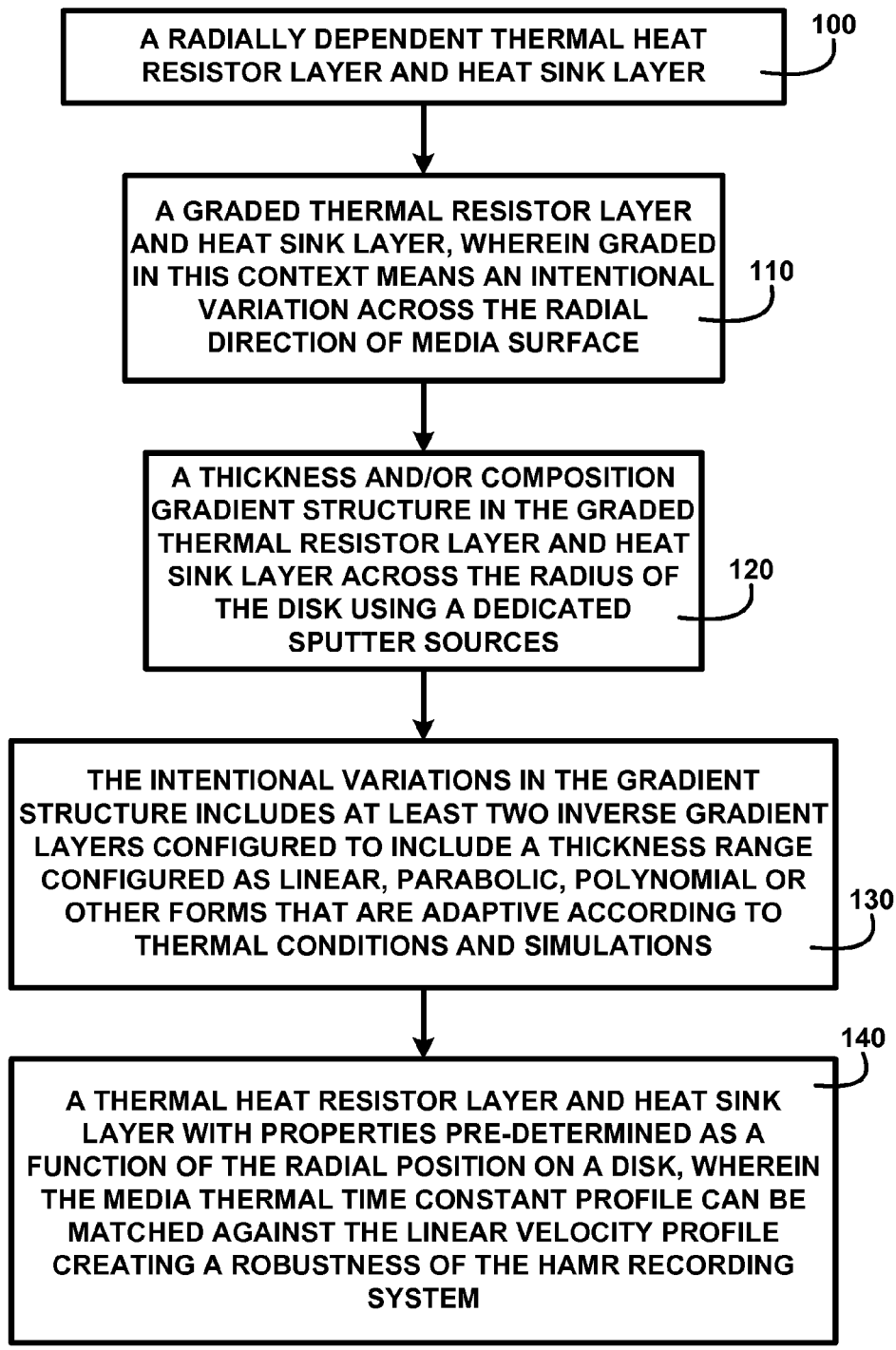
FIG. 1 shows a block diagram of an overview of a radially dependent thermal heat resistor layer of one embodiment.

FIG. 1 shows a block diagram of an overview of a radially dependent thermal heat resistor layer of one embodiment. FIG. 1 shows a radially dependent thermal heat resistor layer and heat sink layer 100. The radially dependent thermal heat resistor layer and heat sink layer includes at least two inverse gradient layers across a radius of the device. The radially dependent thermal heat resistor layer and heat sink layer 100 includes a graded thermal resistor layer and heat sink layer, wherein graded in this context means an intentional variation across the radial direction of media surface 110.

The intentional variations across the radial direction of media surface is created using a thickness and/or composition gradient structure in the graded thermal resistor layer and heat sink layer across the radius of the disk using a dedicated sputter sources 120. The intentional variations in the gradient structure includes at least two inverse gradient layers configured to include a thickness range configured as linear, parabolic, polynomial or other forms that are adaptive according to thermal conditions and simulations 130. The gradient structure includes a thermal heat resistor layer and heat sink layer with properties pre-determined as a function of the radial position on a disk, wherein the media thermal time constant profile can be matched against the linear velocity profile creating a robustness of the HAMR recording system 140 of one embodiment.

Detailed Description

Figure 2:
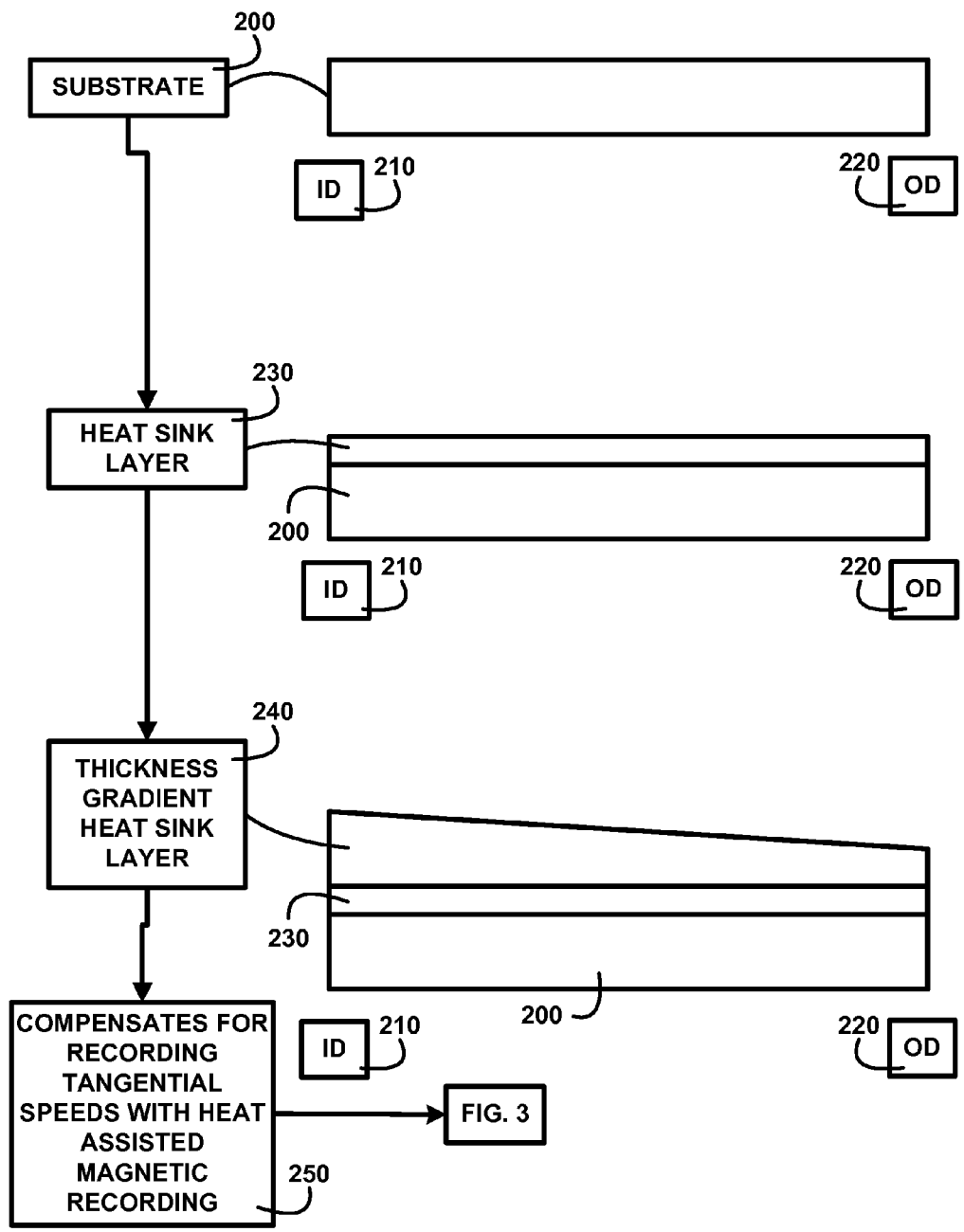
FIG. 2 shows for illustrative purposes only an example of a thickness gradient heat sink layer of one embodiment.

FIG. 2 shows a block diagram of an overview flow chart of a thickness gradient heat sink layer of one embodiment. FIG. 2 shows a substrate 200 wherein the substrate 200 is circular and includes an inner diameter, ID 210 and an outer diameter, OD 220. The substrate 200 can include using materials including quartz, silicone and other materials. Deposited onto the substrate 200 is a continuous heat sink layer 230 with a constant thickness. The continuous heat sink layer 230 can include using materials with predetermined properties of thermal conductivity of one embodiment.

A thickness gradient heat sink layer 240 is deposited on the continuous heat sink layer 230. The thickness gradient heat sink layer 240 is part of the gradient structure that compensates for recording tangential speeds with heat assisted magnetic recording 250. The thickness gradient heat sink layer 240 can include using materials with predetermined properties of thermal conductivity. FIG. 2 shows where from the ID 210 the thickness gradient heat sink layer 240 is diminishing in thickness as the radial distance increases toward to OD 220. The thickness gradient of the thickness gradient heat sink layer 240 material is configured to correlate to the changes in the linear velocity of the recording head and the thermal time constant of the media of one embodiment. The fabrication process is further described in FIG. 3.

FIG. 3 shows a block diagram of an overview flow chart of a radially dependent thermal heat resistor layer structure of one embodiment. FIG. 3 shows a continuation from FIG. 2 that includes a non-magnetic graded thermal resist layer 300 deposited on top of the thickness gradient heat sink layer 240 on the continuous heat sink layer 230. The non-magnetic graded thermal resist layer 300 is part of the gradient structure that compensates for recording tangential speeds with heat assisted magnetic recording 250. The non-magnetic graded thermal resist layer 300 can include using materials including with predetermined properties of thermal conductivity of one embodiment.

FIG. 3 shows the thickness of the non-magnetic graded thermal resist layer 300 diminishing from the OD 220 to the ID 210 of the substrate 200. The thickness gradient of the non-magnetic graded thermal resist layer 300 material is configured to correlate to the changes in the linear velocity of the recording head and the thermal time constant of the media of one embodiment.

On top of the non-magnetic graded thermal resist layer 300 magnetic features 310 are formed by deposition magnetic materials that can be patterned and used in a heat assisted magnetic recording (HAMR) mode of operation. A HAMR recording system 320 applies heat to the magnetic features 310 to facilitate the recording operation. The gradient structure including the non-magnetic graded thermal resist layer 300, thickness gradient heat sink layer 240 and continuous heat sink layer 230 are used to control the heat level in the magnetic features 310 during a recording operation.

The control the heat level in the magnetic features 310 during a recording operation includes compensating graded heat dissipation 330 of the recording head heat assist 340. The control of the heat dissipation corresponds to the linear velocity of the recording head as it changes with the movement of the recording head back and forth between the ID 210 and OD 220 of the substrate 200. The rate of dissipation using a radially dependent thermal heat resistor layer structure 350 compensates for the thermal time constant of the media of one embodiment.

Figure 4A:
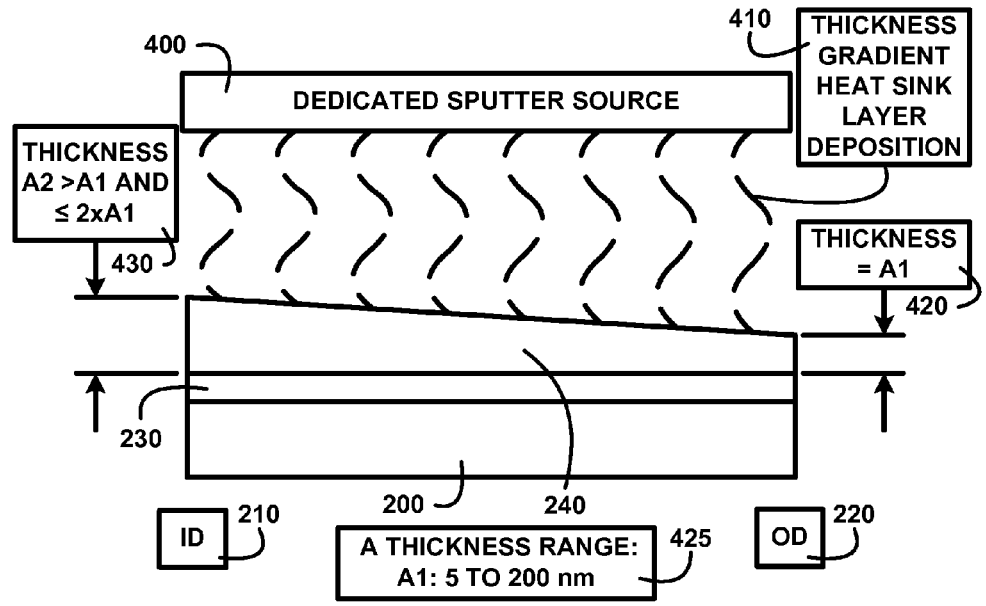
FIG. 4A shows for illustrative purposes only an example of a thickness gradient heat sink layer deposition of one embodiment.

FIG. 4A shows for illustrative purposes only an example of a thickness gradient heat sink layer deposition of one embodiment. FIG. 4A shows a dedicated sputter source 400 used to make a thickness gradient heat sink layer deposition 410 on top of the continuous heat sink layer 230. The dedicated sputter source 400 deposits a thickness=A1 420 at the OD 220 of the substrate 200. The dedicated sputter source 400 is configured to increase the thickness of the thickness gradient heat sink layer 240 deposition to a thickness A2>A1 and ≤2×a1 430 at the ID 210 of the substrate 200. The gradient of the graded heat sink layer across the radius of the device is configured to include a thickness range configured as linear, parabolic, polynomial or other forms that are adaptive according to thermal conditions and simulations. The gradient heat sink layer 240 includes for example a thickness range: A1: 5 to 200 nm 425 of one embodiment.

Figure 4B:
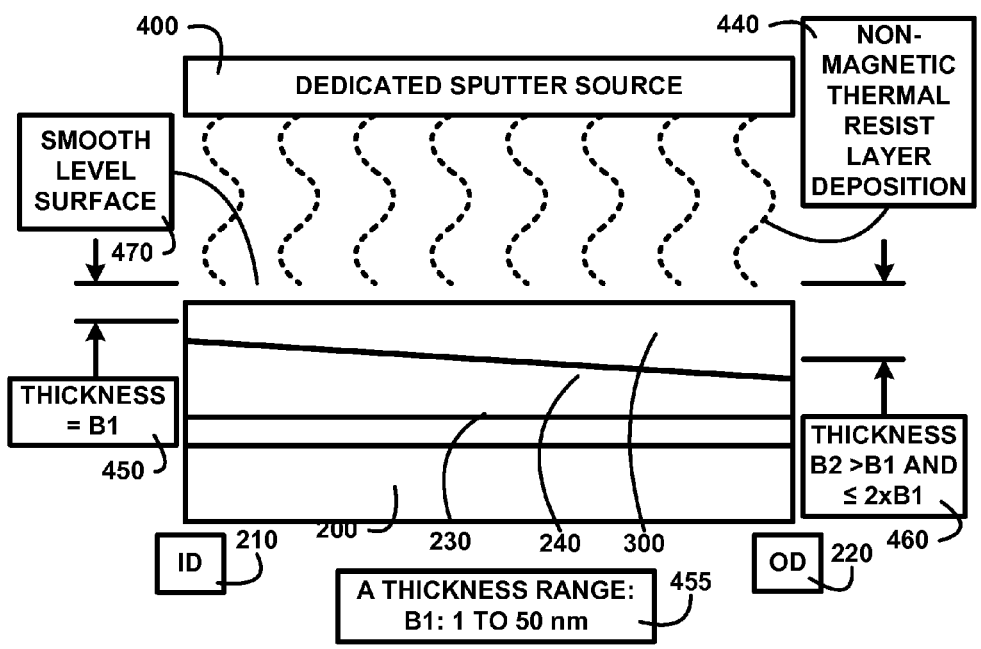
FIG. 4B shows for illustrative purposes only an example of a non-magnetic thermal resist layer deposition of one embodiment.

FIG. 4B shows for illustrative purposes only an example of a non-magnetic thermal resist layer deposition of one embodiment. FIG. 4B shows a dedicated sputter source 400 used for a non-magnetic graded thermal resist layer deposition 440. The non-magnetic graded thermal resist layer deposition 440 has a thickness=B1 450 at an inner circumference ID 210 and at the outer circumference OD 220 a thickness B2>B1 and ≤2×B1 460. The gradient of the non-magnetic graded thermal resist layer across the radius of the device is configured to include a thickness range configured as linear, parabolic, polynomial or other forms that are adaptive according to thermal conditions and simulations. The non-magnetic graded thermal resist layer deposition 440 includes for example a thickness Range: B1: 1 to 50 nm 455 of one embodiment.

The top surface of the non-magnetic graded thermal resist layer deposition 440 is a smooth level surface 470 parallel to the substrate 200 and of a non-coarse finish free of undulating topography. The non-magnetic graded thermal resist layer 300 is deposited on the thickness gradient heat sink layer 240, which is on top of the heat sink layer 230 on and in contact with the substrate 200 of one embodiment.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A data storage disk, comprising:
a radial thickness-gradient heat sink layer deposited over a heat sink layer deposited over a substrate;
a radial thickness-gradient, non-magnetic thermal resist layer deposited over the thickness-gradient heat sink layer; and
a magnetic layer deposited over the thermal resist layer.

2. The data storage disk of claim 1,
wherein the thermal resist layer and the thickness-gradient heat sink layer properties include a radial position function whereby a media thermal time constant profile is matched against a linear velocity profile.

3. An apparatus, comprising:
a second heat sink layer deposited over a first heat sink layer deposited over a disk-shaped substrate,
wherein the second heat sink layer includes a radial thickness gradient;
a non-magnetic thermal resist layer deposited over the second heat sink layer,
wherein the thermal resist layer includes a radial thickness gradient; and
a magnetic layer deposited over the thermal resist layer configured for magnetic recording.

4. The apparatus of claim 3,
wherein the second heat sink layer includes a thickness at an outer diameter equal to a value A1 and a thickness at an inner diameter equal to a value A2, and
wherein A2>A1, A2≤2·A1, and A1 is 5 to 200 nm.

5. The apparatus of claim 3,
wherein the thermal resist layer includes a thickness at an inner diameter equal to a value B1 and a thickness at an outer diameter equal to a value B2, and
wherein B2>B1, B2≤2·B1, and B1 is 1 to 50 nm.

6. The data storage disk of claim 1,
wherein the thermal resist layer includes a smooth level top surface parallel to the substrate and a non-coarse finish free of undulating topography.

7. The apparatus of claim 3,
wherein the thickness gradient of the thermal resist layer and the thickness gradient of the second heat sink layer are configured for compensating graded heat dissipation and recording time changes with heat-assisted magnetic recording.

8. The apparatus of claim 3,
wherein the thermal resist layer includes at least one material used for compensating graded heat dissipation.

9. The data storage disk of claim 2,
wherein the materials for each of the thermal resist layer and the heat sink layer facilitate matching the media thermal time constant profile against the linear velocity profile.

10. An apparatus, comprising:
a multi-layered disk configured for data storage including at least two radially inversed thickness-gradient layers configured to compensate for recording tangential speeds with heat-assisted magnetic recording,
wherein one of the at least two radially inversed thickness-gradient layers includes a first thickness-gradient layer including a non-magnetic thermal resist layer deposited on a heat sink layer.

11. The apparatus of claim 10,
wherein the thermal resist layer includes a thickness at an inner diameter equal to a value B1 and a thickness at an outer diameter equal to a value B2, and
wherein B2>B1, B2≤2·B1, and B1 is 1 to 50 nm.

12. The apparatus of claim 10,
wherein another one of the at least two radially inversed thickness-gradient layers includes a second thickness-gradient layer including the heat sink layer,
wherein the heat sink layer includes a thickness at an outer diameter equal to a value A1 and a thickness at an inner diameter equal to a value A2, and
wherein A2>A1, A2≤2·A1, and A1 is 5 to 200 nm.

13. The apparatus of claim 10,
wherein the radially inversed thickness-gradient layers are deposited on a uniformly thick heat sink layer deposited on a substrate, and
wherein the radially inversed thickness-gradient layers include thickness profiles configured as linear, parabolic, or polynomial.

14. The apparatus of claim 10,
wherein the radially inversed thickness-gradient layers are configured for compensating graded heat dissipation to match a media thermal time constant profile against a linear velocity profile.

15. A structure, comprising:
a disk-shaped substrate;
a first heat sink layer deposited over the substrate;
a second heat sink layer deposited over the first heat sink layer,
wherein the second heat sink layer includes a radial thickness gradient;
a non-magnetic thermal resist layer deposited over the second heat sink layer,
wherein the thermal resist layer includes a radial thickness gradient inversely related to the thickness gradient of the second heat sink layer; and
a magnetic layer deposited over the thermal resist layer configured for magnetic recording.

16. The structure of claim 15,
wherein the thickness gradient of the second heat sink layer and the thickness gradient of the thermal resist layer include inversely related thickness profiles configured as linear, parabolic, or polynomial.

17. The structure of claim 15,
wherein the thermal resist layer includes a thickness at an inner diameter equal to a value B1 and a thickness at an outer diameter equal to a value B2, and
wherein B2>B1, B2≤2·B1, and B1 is 1 to 50 nm.

18. The structure of claim 15,
wherein the second heat sink layer includes a thickness at an outer diameter equal to a value A1 and a thickness at an inner diameter equal to a value A2, and
wherein A2>A1, A2≤2·A1, and A1 is 5 to 200 nm.

19. The apparatus of claim 3,
wherein the thickness gradient of the thermal resist layer and the thickness gradient of the second heat sink layer are radially inversed and configured to include a thickness profile configured as linear, parabolic, or polynomial.

20. The apparatus of claim 3,
wherein the magnetic layer comprises patterned magnetic features configured for heat-assisted magnetic recording.

21. The structure of claim 15,
wherein the magnetic layer comprises patterned magnetic features configured for heat-assisted magnetic recording.

* * * * *